United States Patent [19]
Tran et al.

[11] Patent Number: 6,148,393
[45] Date of Patent: *Nov. 14, 2000

[54] APPARATUS FOR GENERATING A VALID MASK

[75] Inventors: Thang M. Tran; Rammohan Narayan; Shane Southard, all of Austin, Tex.

[73] Assignee: Advanced Micro Devices, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/041,316

[22] Filed: Mar. 12, 1998

Related U.S. Application Data

[63] Continuation-in-part of application No. 08/813,568, Mar. 10, 1997, Pat. No. 5,852,727, which is a continuation-in-part of application No. 08/814,628, Mar. 10, 1997, Pat. No. 5,850,532.

[51] Int. Cl.[7] .................................. G06F 9/30; G06F 9/28
[52] U.S. Cl. ........................... 712/213; 712/215; 712/217
[58] Field of Search ..................................... 712/224, 208, 712/215, 213, 217, 223; 711/118; 326/58, 33

[56] References Cited

U.S. PATENT DOCUMENTS

| | | | |
|---|---|---|---|
| 4,940,908 | 7/1990 | Tran | 326/17 |
| 5,332,932 | 7/1994 | Runaldue | 326/33 |
| 5,345,569 | 9/1994 | Tran | 712/217 |
| 5,729,725 | 3/1998 | Kato et al. | 712/224 |
| 5,852,727 | 12/1998 | Narayan et al. | 712/215 |
| 5,860,092 | 1/1999 | Breid et al. | 711/118 |
| 5,896,518 | 4/1999 | Yao et al. | 712/208 |
| 5,900,744 | 5/1999 | Bisen et al. | 326/58 |
| 5,996,067 | 11/1999 | White | 712/224 |

OTHER PUBLICATIONS

Matson, et al., "Circuit Implementation of a 600MHz Superscalar RISC Microprocessor," International Conference on Computer Design : VLSI in Computers and Processors, Feb. 1998, Austin, Texas. /IEEE International Conference on Computer Design, pp. 104–110.

*Primary Examiner*—Meng-Ai T. An
*Assistant Examiner*—J. Chang
*Attorney, Agent, or Firm*—Conley, Rose & Tayon, P.C.; Dan R. Christen

[57] ABSTRACT

A valid mask generator comprising a series of mask generation blocks. Each block generates a predetermined number of valid mask bits given a predetermined number of start pointer bits and end bits, wherein said predetermined number of valid mask bits generated by each block is less than the total number of bits in the valid mask. The series of mask generation blocks may be connected in series, wherein each block outputs a carry-out signal, and wherein each block receives the carry-out signal from the node before it as a carry-in signal. A method for generating a valid mask from a start pointer and a plurality of end bits is also contemplated.

19 Claims, 7 Drawing Sheets

APPARATUS FOR GENERATING A VALID MASK

CROSS-REFERENCE TO RELATED APPLICATIONS

This application is a continuation-in-part of (i) application Ser. No. 08/813,568, filed on Mar. 10, 1997, now issued as U.S. Pat. No. 5,852,727, and (ii) application Ser. No. 08/814,628, filed on Mar. 10, 1997, now issued as U.S. Pat. No. 5,850,532.

BACKGROUND OF THE INVENTION

1. Field of the Invention

This invention relates to microprocessor circuits and more particularly, to the generation of valid masks from a series of end bits and a start pointer.

2. Description of the Relevant Art

Superscalar microprocessors are capable of attaining performance characteristics which surpass those of conventional scalar processors by allowing the concurrent execution of multiple instructions. Due to the widespread acceptance of the x86 family of microprocessors, efforts have been undertaken by microprocessor manufacturers to develop superscalar microprocessors which execute x86 instructions. Such superscalar microprocessors achieve relatively high performance characteristics while advantageously maintaining backwards compatibility with the vast amount of existing software developed for previous microprocessor generations such as the 8086, 80286, 80386, and 80486.

The x86 instruction set is relatively complex and is characterized by a plurality of variable byte length instructions. A generic format illustrative of the x86 instruction set is shown in FIG. 1. As illustrated in the figure, an x86 instruction consists of from one to five optional prefix bytes 102, followed by an operation code (opcode) field 104, an optional addressing mode (Mod R/M) byte 106, an optional scale-index-base (SIB) byte 108, an optional displacement field 110, and an optional immediate data field 112.

The opcode field 104 defines the basic operation for a particular instruction. The default operation of a particular opcode may be modified by one or more prefix bytes. For example, a prefix byte may be used to change the address or operand size for an instruction, to override the default segment used in memory addressing, or to instruct the processor to repeat a string operation a number of times. The opcode field 104 follows the prefix bytes 102, if any, and may be one or two bytes in length. The addressing mode (Mod R/M) byte 106 specifies the registers used as well as memory addressing modes. The scale-index-base (SIB) byte 108 is used only in 32-bit base-relative addressing using scale and index factors. A base field of the SIB byte specifies which register contains the base value for the address calculation, and an index field specifies which register contains the index value. A scale field specifies the power of two by which the index value will be multiplied before being added, along with any displacement, to the base value. The next instruction field is the optional displacement field 110, which may be from one to four bytes in length. The displacement field 110 contains a constant used in address calculations. The optional immediate field 112, which may also be from one to four bytes in length, contains a constant used as an instruction operand. The shortest x86 instructions are only one byte long, and comprise a single opcode byte. The 80286 sets a maximum length for an instruction at 10 bytes, while the 80386 and 80486 both allow instruction lengths of up to 15 bytes.

The complexity of the x86 instruction set poses difficulties in implementing high performance x86 compatible superscalar microprocessors. One difficulty arises from the fact that instructions must be scanned and aligned with respect to the parallel-coupled instruction decoders of such processors before proper decode can be effectuated. In contrast to most RISC instruction formats, since the x86 instruction set consists of variable byte length instructions, the start bytes of successive instructions within a line are not necessarily equally spaced, and the number of instructions per line is not fixed. As a result, employment of simple, fixed-length shifting logic cannot in itself solve the problem of instruction alignment. Although scanning logic has been proposed to dynamically find the boundaries of instructions during the decode pipeline stage (or stages) of the processor, such a solution typically requires that the decode pipeline stage of the processor be implemented with a relatively large number of cascaded levels of logic gates and/or the allocation of several clock cycles to perform the scanning operation. This correspondingly limits the maximum overall clock frequency of the superscalar microprocessor.

Instruction scanning mechanisms which detect instruction boundaries and identify valid instructions have been proposed to address this problem. Typically, start and end bits are generated for each instruction byte as they are stored in the instruction cache. These start and end bits are then used to generate a valid mask for each instruction. A valid mask is a series of bits in which each consecutive bit corresponds to a particular byte of instruction information. For a particular instruction fetch, the valid mask bits associated with the first byte of the instruction, the last byte of the instruction, and all bytes in between the first and last bytes of the instruction are asserted. All other bits in the valid mask are not asserted. For example, given the following 8-byte instruction cache line, the valid mask for a fetch of instruction B would appear as follows:

|                     | byte | 0 | 1 | 2 | 3 | 4 | 5 | 6 | 7  |
|---------------------|------|---|---|---|---|---|---|---|----|
| cache line          |      | A | A | B | B | B | B | C | C... |
|                     | bit  | 0 | 1 | 2 | 3 | 4 | 5 | 6 | 7  |
| end bit information |      | 0 | 1 | 0 | 0 | 0 | 1 | 0 | 0  |
| start pointer       |      | 0 | 0 | 1 | 0 | 0 | 0 | 0 | 0  |
| valid mask          |      | 0 | 0 | 1 | 1 | 1 | 1 | 0 | 0  |

Once a valid mask is calculated for a particular instruction fetch, it may then be used to mask off the unwanted bytes that are not part of the particular instruction. In the example above, the valid mask for the fetch of instruction B could be used to mask off the unwanted end bytes of instruction A and the unwanted beginning bytes of instruction C.

While several different configurations of valid mask generators have been proposed, these configurations typically require several levels of cascaded logic. These configurations increase the complexity of circuit layout and are slow because of the large number of gates through which the mask must propagate. Therefore, a valid mask generator using fewer logic gates and with a faster calculation time is desired.

SUMMARY OF THE INVENTION

The problems outlined above are in large part solved by a valid mask generator configured according to the present invention. One embodiment of such a valid mask generator comprises a series of two-input NOR gates, wherein each NOR gate receives as inputs one bit from a start pointer and one end bit. The valid mask generator also comprises a series of nodes and a series of pass transistors. Each pass transistor connects two nodes together in series and is controlled by the output of one of the NOR gates. The valid mask generator also comprises a series of discharge transistors. One discharge transistor is connected to each node, and each discharge transistor is controlled by one end bit. Finally, a valid mask bit output is connected to each node.

Advantageously, the valid mask generator does not require a large number of logic levels. Reducing the number of logic levels may improve the speed of valid mask generation. Precharging the nodes may further speed the valid mask generation.

In another embodiment, the output from the last node is provided as input to a feedback discharging transistor. The feedback discharging transistor is coupled to the first node and is configured to discharge the first node if the last node is discharged. A carry-out output may be also generated from the last node. This carry-out output may be used as a carry-in input by other blocks of valid mask generators. This configuration advantageously allows multiple mask generators to be used together to quickly generate long valid masks. Dividing the valid mask generation circuitry into multiple blocks may also advantageously ease the physical layout of the circuit.

In another embodiment, the valid mask generator 5 comprises: a series of mask generation blocks, wherein each block generates a predetermined number of valid mask bits given a predetermined number of start pointer bits and end bits, wherein said predetermined number is less than the total number of bits in the valid bit mask. The series of mask generation blocks may be connected in series, wherein each block outputs a carry-out signal, and wherein each block receives the carry-out signal from the node before it as a carry-in signal.

A method for generating a valid mask from a start pointer and a plurality of end bits is also contemplated. One embodiment of the method comprises precharging a series of nodes to an asserted state. The nodes, which are electrically connected in series, each have an inverted output that corresponds to one bit of the valid mask. Each node corresponds to one end bit and one start pointer bit. The nodes between an asserted start pointer bit and the first asserted end bit are electrically isolated from the remaining nodes. Any nodes associated with an asserted end bit are discharged, wherein the discharging also discharges any nodes electrically connected to the node being discharged. This configuration advantageously allows large valid masks to be generated with minimal delay while providing for easier layout of the circuit.

BRIEF DESCRIPTION OF THE DRAWINGS

Other objects and advantages of the invention will become apparent upon reading the following detailed description and upon reference to the accompanying drawings in which.

Figure 1:
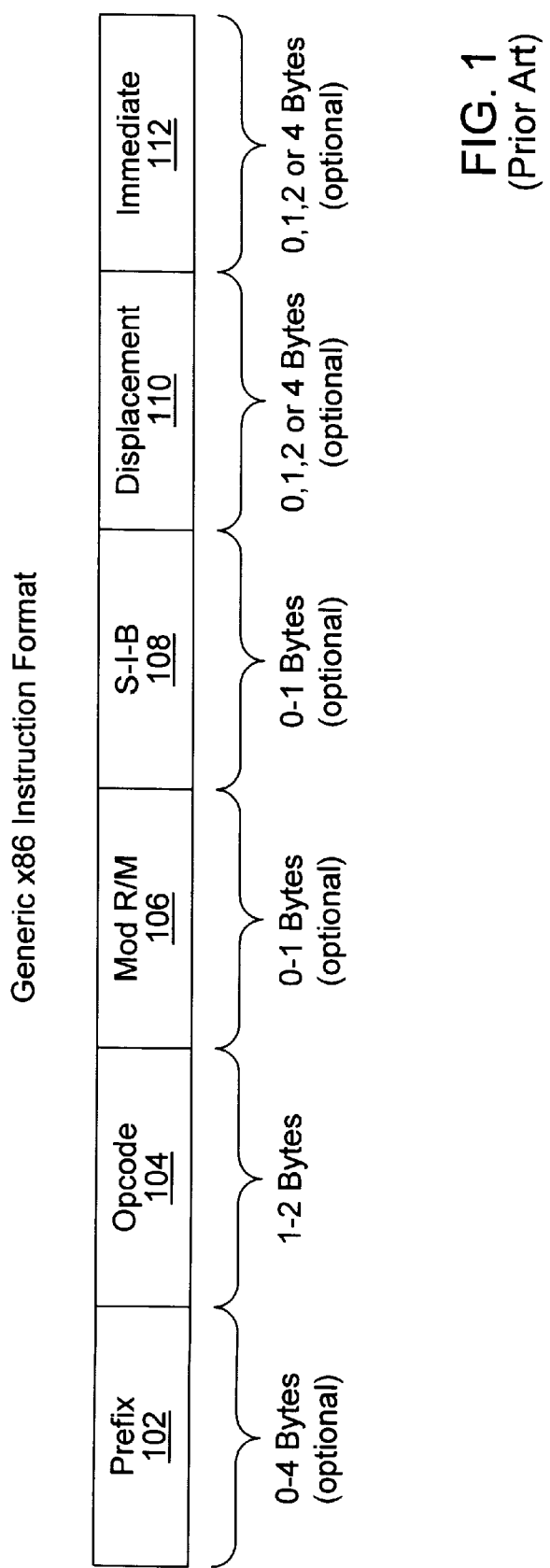
FIG. 1 is a block diagram of a generic x86 instruction format.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
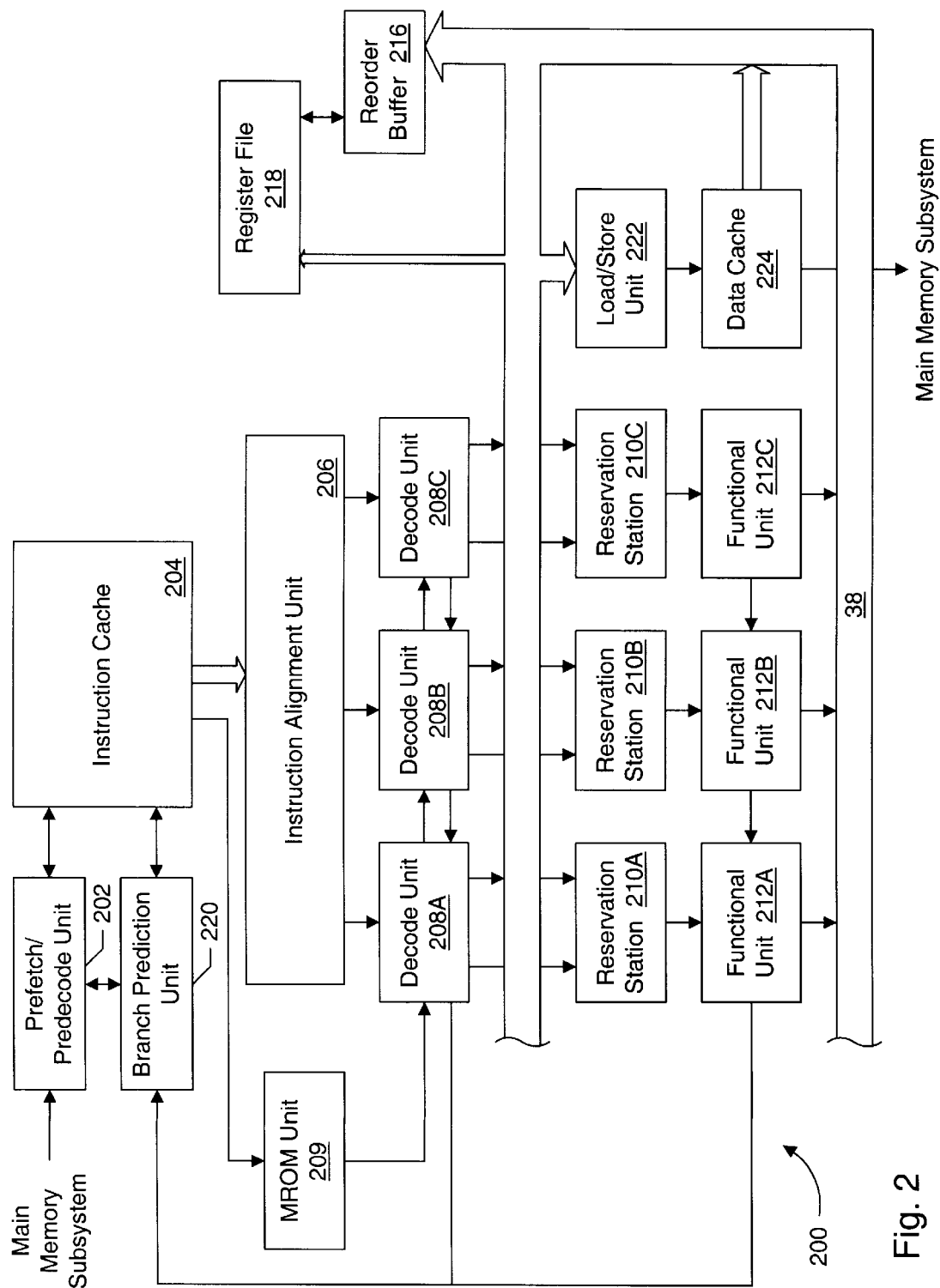
FIG. 2 is a block diagram of a superscalar microprocessor including an instruction cache.

Turning now to FIG. 2, a block diagram of one embodiment of a microprocessor 200 is shown. Microprocessor 200 includes a prefetch/predecode unit 202, a branch prediction unit 220, an instruction cache 204, an instruction alignment unit 206, a plurality of decode units 208A–208C, a plurality of reservation stations 210A–210C, a plurality of functional units 212A–212C, a load/store unit 222, a data cache 224, a register file 218, a reorder buffer 216, and an MROM unit 209. Elements referred to herein with a particular reference number followed by a letter will be collectively referred to by the reference number alone. For example, decode units 208A–208C will be collectively referred to as decode units 208.

Prefetch/predecode unit 202 is coupled to receive instructions from a main memory subsystem (not shown), and is further coupled to instruction cache 204 and branch prediction unit 220. Similarly, branch prediction unit 220 is coupled to instruction cache 204. Still further, branch prediction unit 220 is coupled to decode units 208 and functional units 212. Instruction cache 204 is further coupled to MROM unit 209 and instruction alignment unit 206. Instruction alignment unit 206 is in turn coupled to decode units 208. Each decode unit 208A–208C is coupled to load/store unit 222 and to respective reservation stations 210A–210C. Reservation stations 210A–210C are further coupled to respective functional units 212A–212C. Additionally, decode units 208 and reservation stations 210 are coupled to register file 218 and reorder buffer 216. Functional units 212 are coupled to load/store unit 222, register file 218, and reorder buffer 216 as well. Data cache 224 is coupled to load/store unit 222 and to the main memory subsystem. Finally, MROM unit 209 is coupled to decode units 208.

Instruction cache 204 is a high speed cache memory provided to store instructions. Instructions are fetched from instruction cache 204 and dispatched to decode units 208. In one embodiment, instruction cache 204 is configured to store up to 64 kilobytes of instructions in a 4 way set associative structure having 32 byte lines (a byte comprises 8 binary bits). Alternatively, 2 way set associativity may be employed as well as any other desired associativity. Instruction cache 204 may additionally employ a way prediction scheme in order to speed access times to the instruction cache 204. Instead of accessing tags identifying each line of instructions and comparing the tags to the fetch address to select a way, instruction cache 204 predicts the way that is accessed. In this manner, the way is selected prior to accessing the instruction storage. The access time of instruction cache 204 may be similar to a direct-mapped cache. A tag comparison is performed and, if the way prediction is incorrect, the correct instructions are fetched and the incorrect instructions are discarded. It is noted that instruction cache 204 may be implemented as a fully associative, set associative, or direct mapped configuration.

Instructions are fetched from main memory and stored into instruction cache 204 by prefetch/predecode unit 202. Instructions may be prefetched prior to the request thereof from instruction cache 204 in accordance with a prefetch scheme. A variety of prefetch schemes may be employed by prefetch/predecode unit 202. As prefetch/predecode unit 202 transfers instructions from main memory to instruction cache 204, prefetch/predecode unit 202 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 208 or whether the instruction is executed by invoking a microcode procedure controlled by MROM unit 209, as will be described in greater detail below. Still further, prefetch/predecode unit 202 may be configured to detect branch instructions and to store branch prediction information corresponding to the branch instructions into branch prediction unit 220.

One encoding of the predecode tags for an embodiment of microprocessor 200 employing a variable byte length instruction set will next be described. A variable byte length instruction set is an instruction set in which different instructions may occupy differing numbers of bytes. An exemplary variable byte length instruction set employed by one embodiment of microprocessor 200 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 208 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 208 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identification of an instruction that includes a scale-index-base (SIB) byte is advantageous for MROM unit 209. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 208. MROM instructions are executed by invoking MROM unit 209. More specifically, when an MROM instruction is encountered, MRCM unit 209 parses and issues the instruction into a subset of defined fast path instructions to effectuate the desired operation. MROM unit 209 dispatches the subset of fast path instructions to decode units 208. A listing of exemplary x86 instructions categorized as fast path instructions will be provided further below.

Before proceeding with a detailed description of the valid mask generator used within instruction cache 204,general aspects regarding other subsystems employed within the exemplary superscalar microprocessor 200 of FIG. 2 will be described.

Microprocessor 200 employs branch prediction in order to speculatively fetch instructions subsequent to conditional branch instructions. Branch prediction unit 220 is included to perform branch prediction operations. In one embodiment, up to two branch target addresses are stored with respect to each 16 byte portion of each cache line in instruction cache 204. Prefetch/predecode unit 202 determines initial branch targets when a particular line is predecoded. Subsequent updates to the branch targets corresponding to a cache line may occur due to the execution of instructions within the cache line. Instruction cache 204 provides an indication of the instruction address being fetched, so that branch prediction unit 220 may determine which branch target addresses to select for forming a branch prediction. Decode units 208 and functional units 212 provide update information to branch prediction unit 220. Because branch prediction unit 220 stores two targets per 16 byte portion of the cache line, some branch instructions within the line may not be stored in branch prediction unit 220. Decode units 208 detect branch instructions which were not predicted by branch prediction unit 220. Functional units 212 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 200. A variety of suitable branch prediction algorithms may be employed by branch prediction unit 220.

Instructions fetched from instruction cache 204 are conveyed to instruction alignment unit 206. As instructions are fetched from instruction cache 204, the corresponding predecode data is scanned to provide information to instruction alignment unit 206 (and to MROM unit 209) regarding the instructions being fetched. Instruction alignment unit 206 utilizes the scanning data to align an instruction to each of decode units 208. In one embodiment, instruction alignment unit 206 aligns instructions from three sets of eight instruction bytes to decode units 208. Instructions are selected independently from each set of eight instruction bytes into preliminary issue positions. The preliminary issue positions are then merged to a set of aligned issue positions corresponding to decode units 208, such that the aligned issue positions contain the three instructions which are prior to other instructions within the preliminary issue positions in program order. Decode unit 208A receives an instruction which is prior to instructions concurrently received by decode units 208B and 208C (in program order). Similarly, decode unit 208B receives an instruction which is prior to the instruction concurrently received by decode unit 208C in program order.

Decode units 208 are configured to decode instructions received from instruction alignment unit 206. Register operand information is detected and routed to register file 218 and reorder buffer 216. Additionally, if the instructions require one or more memory operations to be performed, decode units 208 dispatch the memory operations to load/store unit 222. Each instruction is decoded into a set of control values for functional units 212, and these control values are dispatched to reservation stations 210 along with operand address information and displacement or immediate data which may be included with the instruction.

Microprocessor 200 supports out of order execution, and thus employs reorder buffer 216 to keep track of the original program sequence for register read and write operations, to implement register renaming, to allow for speculative instruction execution and branch misprediction recovery, and to facilitate precise exceptions. A temporary storage location within reorder buffer 216 is reserved upon decode of an instruction that involves the update of a register to thereby store speculative register states. If a branch prediction is incorrect, the results of speculatively-executed instructions along the mispredicted path can be invalidated in the buffer before they are written to register file 218. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 216.

The instruction control values and immediate or displacement data provided at the outputs of decode units 208 are routed directly to respective reservation stations 210. In one embodiment, each reservation station 210 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 210 is associated with a dedicated functional unit 212. Accordingly, three dedicated "issue positions" are formed by reservation stations 210 and functional units 212. In other words, issue position 0 is formed by reservation station 210A and functional unit 212A. Instructions aligned and dispatched to reservation station 210A are executed by functional unit 212A. Similarly, issue position 1 is formed by reservation station 210B and functional unit 212B; and issue position 2 is formed by reservation station 210C and functional unit 212C.

Upon decode of a particular instruction, if a required operand is a register location, register address information is routed to reorder buffer 216 and register file 218 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 200 which employ the x86 microprocessor architecture, register file 218 comprises storage locations for each of the 32 bit real registers. Additional storage locations may be included within register file 218 for use by MROM unit 209. Reorder buffer 216 contains temporary storage locations for results which change the contents of these registers to thereby allow out of order execution. A temporary storage location of reorder buffer 216 is reserved for each instruction which, upon decode, is determined to modify the contents of one of the real registers. Therefore, at various points during execution of a particular program, reorder buffer 216 may have one or more locations which contain the speculatively executed contents of a given register. If following decode of a given instruction it is determined that reorder buffer 216 has a previous location or locations assigned to a register used as an operand in the given instruction, the reorder buffer 216 forwards to the corresponding reservation station either: 1) the value in the most recently assigned location, or 2) a tag for the most recently assigned location if the value has not yet been produced by the functional unit that will eventually execute the previous instruction. If reorder buffer 216 has a location reserved for a given register, the operand value (or reorder buffer tag) is provided from reorder buffer 216 rather than from register file 218. If there is no location reserved for a required register in reorder buffer 216, the value is taken directly from register file 218. If the operand corresponds to a memory location, the operand value is provided to the reservation station through load/store unit 222.

In one particular embodiment, reorder buffer 216 is configured to store and manipulate concurrently decoded instructions as a unit. This configuration will be referred to herein as "line-oriented". By manipulating several instructions together, the hardware employed within reorder buffer 216 may be simplified. For example, a line-oriented reorder buffer included in the present embodiment allocates storage sufficient for instruction information pertaining to three instructions (one from each decode unit 208) whenever one or more instructions are dispatched by decode units 208. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 218 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 218 and freeing the corresponding storage is referred to as "retiring" the instructions. It is further noted that any reorder buffer configuration may be employed in various embodiments of microprocessor 200.

As noted earlier, reservation stations 210 store instructions until the instructions are executed by the corresponding functional unit 212. An instruction is selected for execution if: (i) the operands of the instruction have been provided; and (ii) the operands have not yet been provided for instructions which are within the same reservation station 210A–210C and which are prior to the instruction in program order. It is noted that when an instruction is executed by one of the functional units 212, the result of that instruction is passed directly to any reservation stations 210 that are waiting for that result at the same time the result is passed to update reorder buffer 216 (this technique is commonly referred to as "result forwarding"). An instruction may be selected for execution and passed to a functional unit 212A–212C during the clock cycle that the associated result is forwarded. Reservation stations 210 route the forwarded result to the functional unit 212 in this case.

In one embodiment, each of the functional units 212 is configured to perform integer arithmetic operations of addition and subtraction, as well as shifts, rotates, logical operations, and branch operations. The operations are performed in response to the control values decoded for a particular instruction by decode units 208. It is noted that a floating point unit (not shown) may also be employed to accommodate floating point operations. The floating point unit may be operated as a coprocessor, receiving instructions from MROM unit 209 and subsequently communicating with reorder buffer 216 to complete the instructions. Additionally, functional units 212 may be configured to perform address generation for load and store memory operations performed by load/store unit 222.

Each of the functional units 212 also provides information regarding the execution of conditional branch instructions to the branch prediction unit 220. If a branch prediction was incorrect, branch prediction unit 220 flushes instructions subsequent to the mispredicted branch that have entered the instruction processing pipeline, and causes fetch of the required instructions from instruction cache 204 or main memory. It is noted that in such situations, results of instructions in the original program sequence which occur after the mispredicted branch instruction are discarded, including those which were speculatively executed and temporarily stored in load/store unit 222 and reorder buffer 216.

Results produced by functional units 212 are sent to reorder buffer 216 if a register value is being updated, and to load/store unit 222 if the contents of a memory location are changed. If the result is to be stored in a register, reorder buffer 216 stores the result in the location reserved for the value of the register when the instruction was decoded. A plurality of result buses 38 are included for forwarding of results from functional units 212 and load/store unit 222. Result buses 38 convey the result generated, as well as the reorder buffer tag identifying the instruction being executed.

Load/store unit 222 provides an interface between functional units 212 and data cache 224. In one embodiment, load/store unit 222 is configured with a load/store buffer having eight storage locations for data and address information for pending loads or stores. Decode units 208 arbitrate for access to the load/store unit 222. When the buffer is full, a decode unit must wait until load/store unit 222 has room for the pending load or store request information. Load/store unit 222 also performs dependency checking for load memory operations against pending store memory operations to ensure that data coherency is maintained. A memory operation is a transfer of data between microprocessor 200 and the main memory subsystem. Memory operations may be the result of an instruction which utilizes an operand stored in memory, or may be the result of a load/store instruction which causes the data transfer but no other operation. Additionally, load/store unit 222 may include a special register storage for special registers such as the segment registers and other registers related to the address translation mechanism defined by the x86 microprocessor architecture.

In one embodiment, load/store unit 222 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 222 may be configured to perform any amount of speculative execution, including no speculative execution.

Data cache 224 is a high speed cache memory provided to temporarily store data being transferred between load/store unit 222 and the main memory subsystem. In one embodiment, data cache 224 has a capacity of storing up to sixteen kilobytes of data in an eight way set associative structure. Similar to instruction cache 204, data cache 224 may employ a way prediction mechanism. It is understood that data cache 224 may be implemented in a variety of specific memory configurations, including a set associative configuration.

In one particular embodiment of microprocessor 200 employing the x86 microprocessor architecture, instruction cache 204 and data cache 224 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

It is still further noted that the present discussion may refer to the assertion of various signals. As used herein, a signal is "asserted" if it conveys a value indicative of a particular condition. Conversely, a signal is "deasserted" or "not asserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Figure 3:
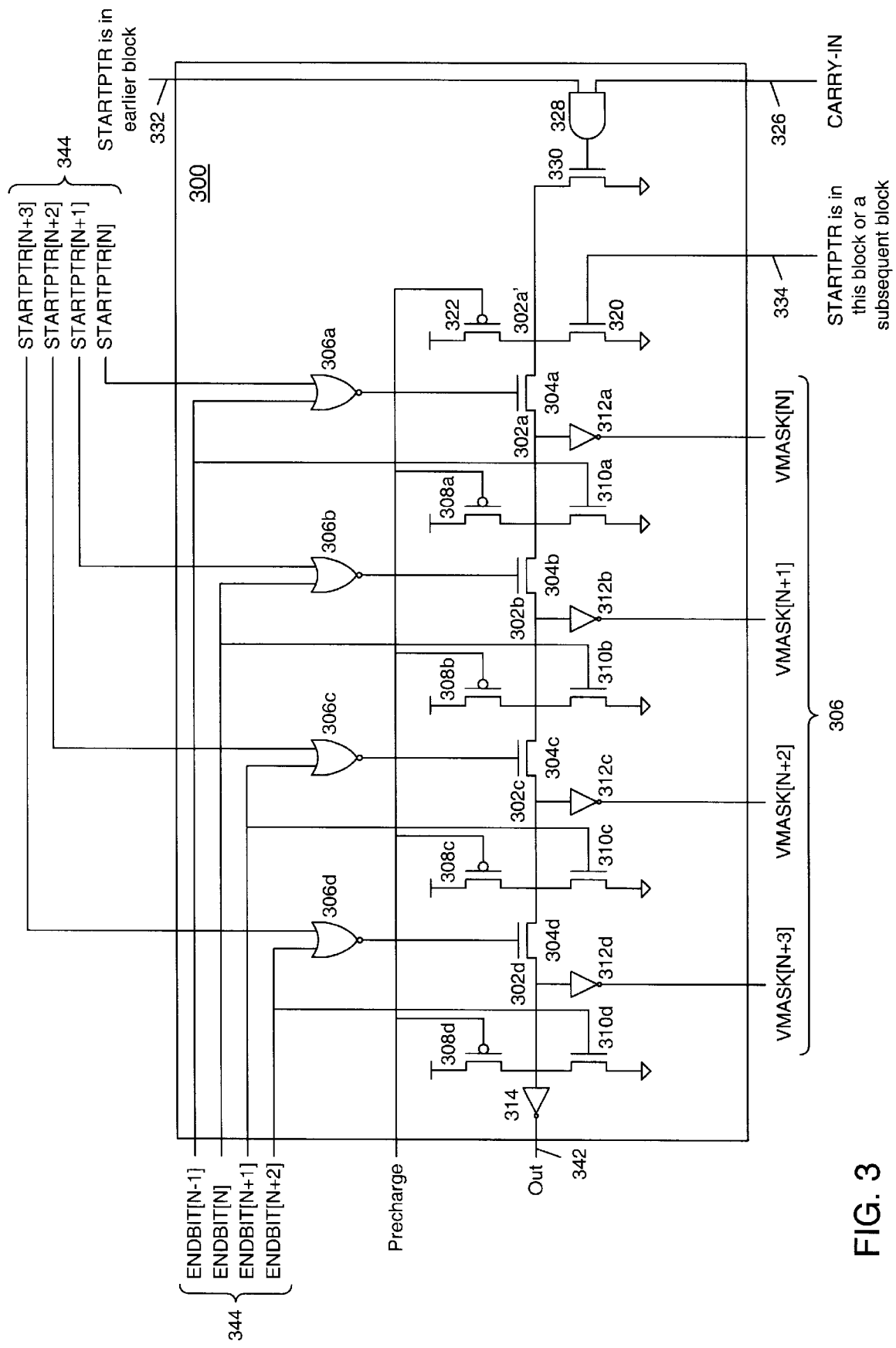
FIG. 3 is a logic diagram of one embodiment of a valid mask generator.

Turning now to FIG. 3, an embodiment of a valid mask generator 300 (which is a part of instruction cache 204) is shown. Valid mask generator 300 comprises a series of nodes 302a–d which are connected in series by pass transistors 304a–d. Pass transistors 304a–d are controlled by the outputs from two-input NOR gates 306a–d. Each NOR gate 306a–d receives a bit from start pointer 344 and a bit from end bits 340 as inputs. A precharge transistor 308a–d, a discharge transistor 310a–d, and an output inverter 312a–d are also connected to each node.

Valid mask generator 300 operates by precharging nodes 302a–d with precharge transistors 308a–d. Once nodes 302a–d are precharged, valid mask generator 300 receives as input a series of end bits 340 from instruction cache 204 and a series of start pointer bits 344 corresponding to the current fetch address. The start pointer, which indicates which byte in a cache line is being fetched, is "one hot" encoded. Thus only a single bit of start pointer 344 is asserted at any given time. For example, if the fourth byte of an eight-byte instruction cache line was the starting byte of an instruction fetch, start pointer 344 would read as follows:

| bit           | 0 1 2 3 4 5 6 7 |
|---------------|-----------------|
| start pointer | 0 0 0 1 0 0 0 0 |

Thus each bit within start pointer bits 344 corresponds to one particular byte within a cache line. For example, STARTPTR[0] corresponds to the first byte in a cache line, while STARTPTR[N] corresponds the Nth byte in a cache line.

Start pointer bits 344 and end bits 340 serve as inputs for NOR gates 306a–306d, which in turn control passing transistors 304a–304d. Valid mask generator 300 is configured so that passing transistors 304a–d are normally activated. Therefore, any activated discharge transistor 310a–310d will normally tend to discharge all nodes 302a–302d. However, any asserted start pointer bits 344 and end bits 340 will deactivate their corresponding passing transistor through OR gates 306a–d. This serves to isolate any nodes between an asserted start pointer bit and an asserted end bit from any activated discharge transistors. For example, inputting an asserted start pointer bit to NOR gate 306a and an asserted end bit to NOR gate 306c would cause pass transistors 304a and 304c to turn off, thereby isolating nodes 302a and 302b from the remaining nodes. The asserted end bit activates discharge transistor 310c, thereby draining the remaining nodes without draining nodes 302a and 302b. Even if there are multiple asserted end bits, the nodes between the activated start pointer bit (of which there is only one for any given mask) and the first end bit will be isolated from any activated discharge transistors.

The following example illustrates the output of valid mask generator 300 for four different sets of inputs:

|               | 0123 | 0123 | 0123 | 0123 |
|---------------|------|------|------|------|
| STARTPTR BITS | 0100 | 0100 | 0001 | 0100 |
| END BITS      | 0010 | 1001 | 0100 | 0000 |
| VMASK         | 1001 | 1000 | 1110 | 1100 |

Note that the valid mask output by valid mask generator 300 is an inverted version of a typical mask, i.e., asserted low versus asserted high. Those skilled in the art will appreciate that a second set of inverters or other similar means may be used to invert the output of valid mask generator 300 to obtain an asserted high mask if desired.

Valid mask generator 300 is configured to be used in combination with other similarly configured valid mask generators to generate wide valid masks quickly. When used in combination, multiple valid mask generators are connected in series, wherein each generator receives a particular subset of start pointer bits and end bits. Valid mask generator 300 has three inputs configured to facilitate the generation of wide masks. Carry-in input 326 is configured to receive a carry-in signal from the pervious generator in the series. Look-ahead input 332 receives a signal indicating whether the asserted start pointer bit is one of the start pointer bits 344 conveyed to an earlier valid mask generator in the series. Conversely, look-ahead input 334 indicates whether the asserted start bit is one of the start pointer bits 344 conveyed to the current valid mask generator or a later mask generator in the series. In one embodiment, input 334 may simply be an inverted copy of look-ahead input 332.

If both carry-in input 326 and look-ahead input 332 are asserted, AND gate 328 will activate discharge transistor 330. Similarly, if look-ahead input 334 is asserted, discharge transistor 320 will be activated. Discharge transistors 320 and 330 operate to discharge any nodes before an asserted start pointer bit.

Output 342 is also provided to allow multiple valid mask generators to operate in parallel. In one embodiment, output 342 forms the carry-in input for the next valid mask generator in the series.

Figure 4A:
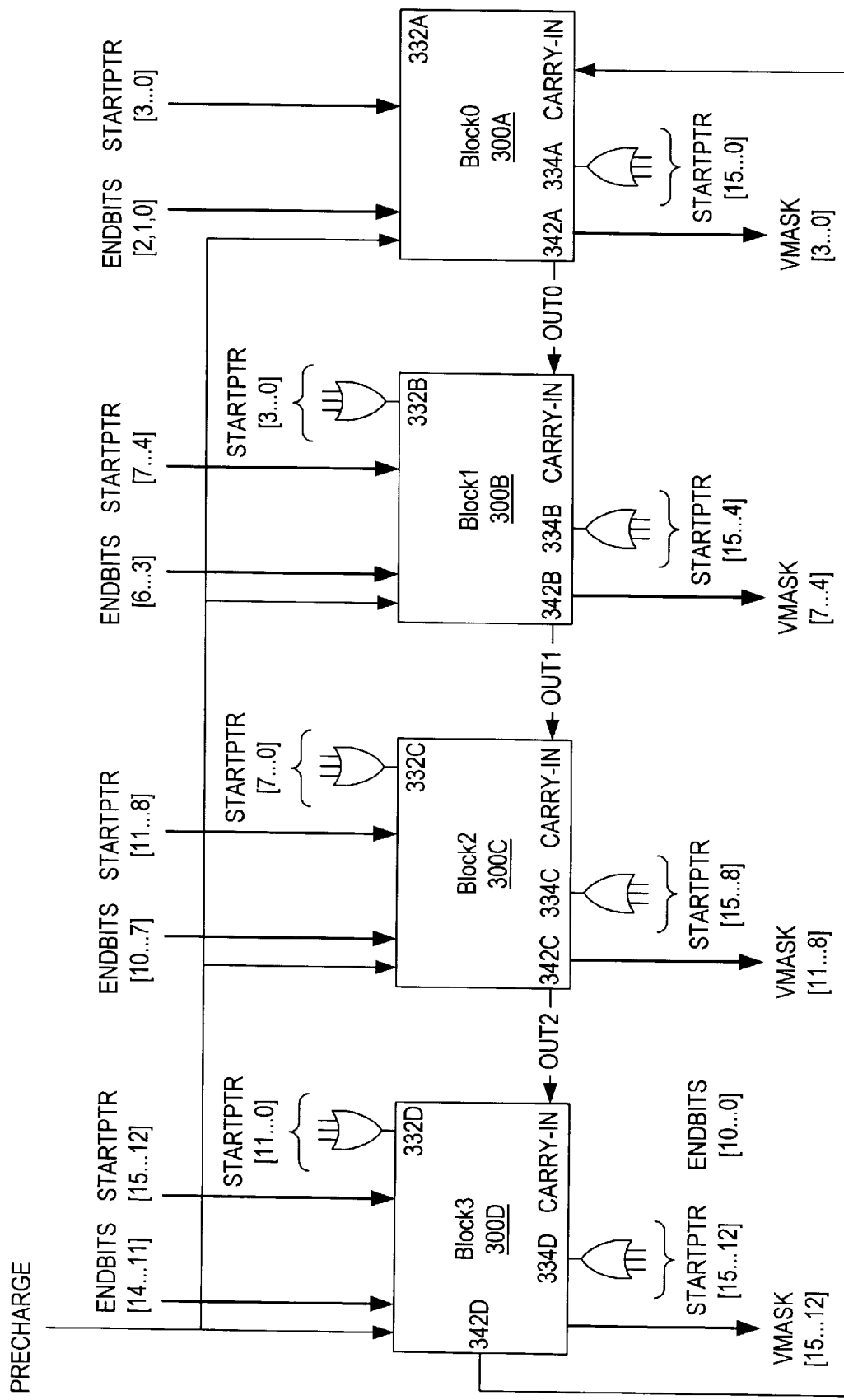
FIG. 4 is a diagram showing one embodiment of a 16-bit valid mask generator that utilizes the valid mask generator of FIG. 3.

Turning now to FIG. 4A, one embodiment of a wide valid mask generator using valid mask generator 300 is shown. As previously noted, the outputs 342A–D form the carry-in inputs of the next valid mask generator in the series. Each valid mask generator 300A–300D receives a different subset of end bits and start pointer bits as inputs, and each valid mask generator 300A–300D generates a different portion of the wide valid mask.

Figure 4B:
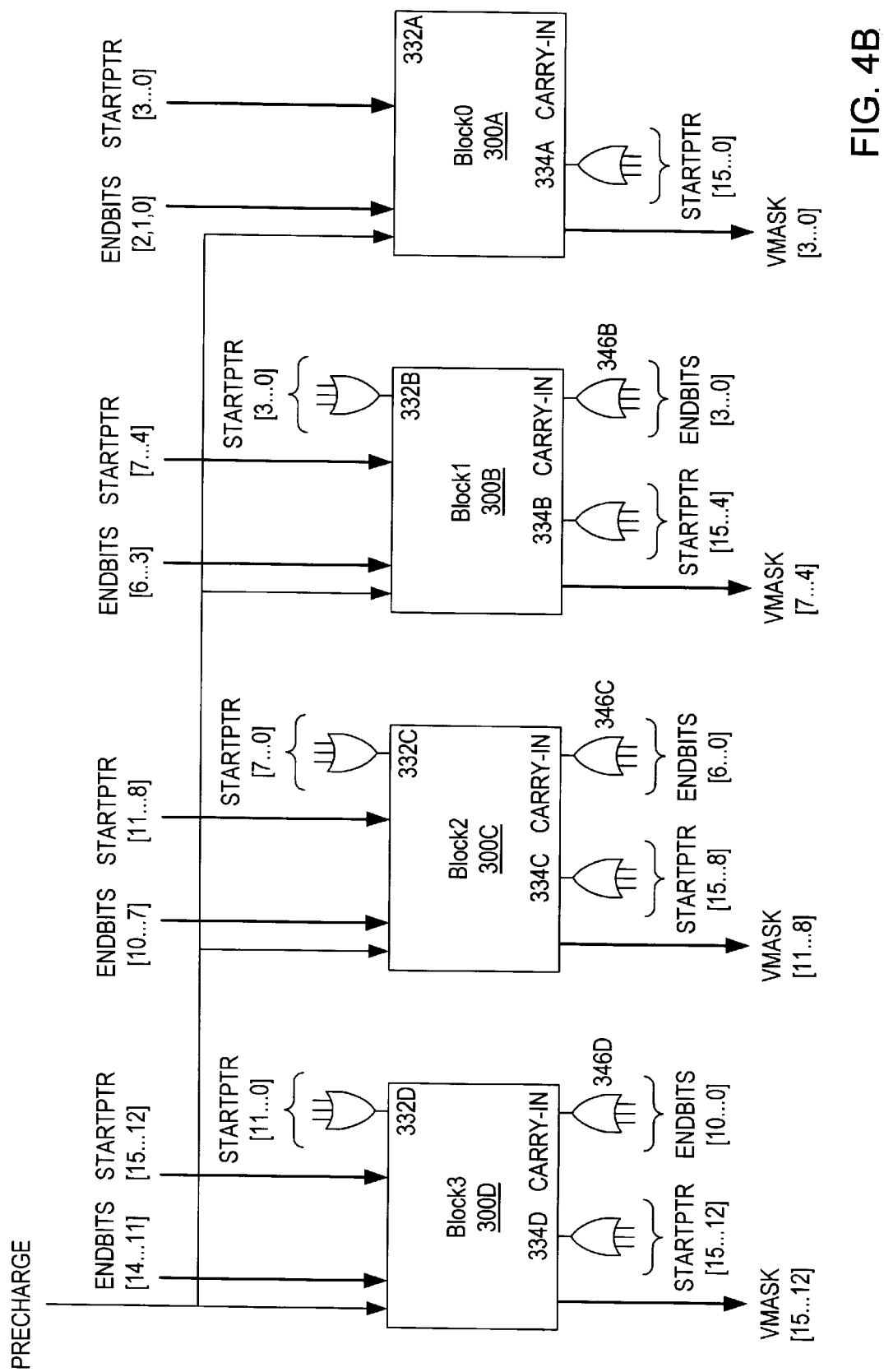

Turning now to FIG. 4B, another embodiment of a wide valid mask generator using valid mask generator 300 is shown. In this configuration, the carry-in inputs are formed using the output of OR gates 346B–D which receive the previous valid mask generator's end bits as input.

The following example illustrates the function of wide valid mask generator illustrated in FIG. 4B for a given 16-bit start pointer and 16-bit end bit input:

|               | BLOCK0 | BLOCK1 | BLOCK2 | BLOCK3 |
|---------------|--------|--------|--------|--------|
|               | 0123   | 4567   | 8901   | 2345   |
| STARTPTR BIT  | 0000   | 0100   | 0000   | 0000   |
| END BIT       | 0010   | 0000   | 0010   | 0010   |
| VMASK OUT     | 1111   | 1000   | 0001   | 1111   |
|               | OUT0=1 | OUT1=0 | OUT2=1 | OUT3=1 |

Using multiple mask generators may advantageously reduce the time required to generate a long valid mask because the mask need not propagate through as many logic gates. Furthermore, dividing the mask generation logic into multiple blocks may advantageously simplify circuit layout and further improve switching time by increasing the ratio of discharging transistors to nodes.

Figure 5:
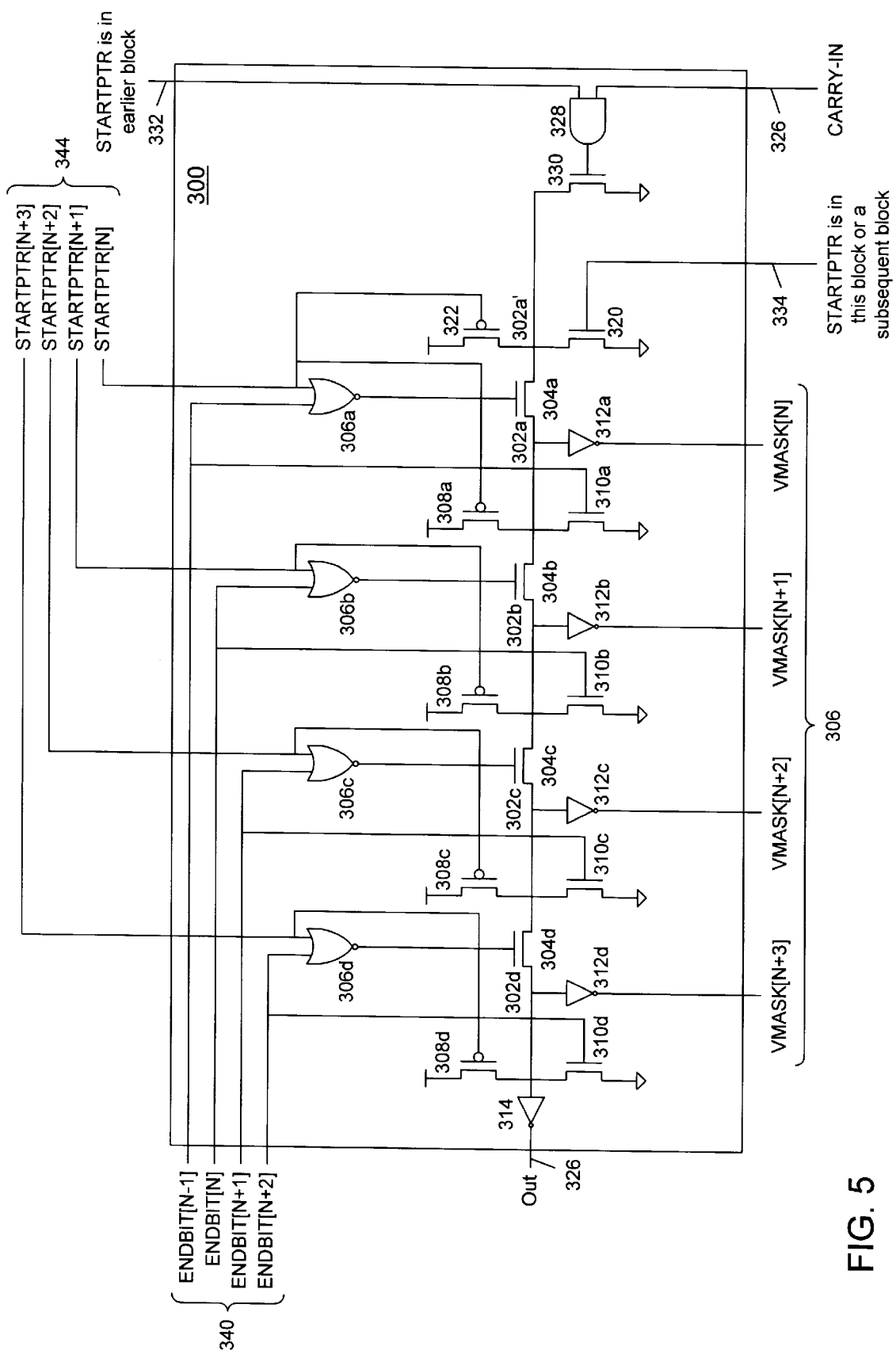
FIG. 5 is a logic diagram of another embodiment of a valid mask generator.

Turning now to FIG. 5, another embodiment of valid mask generator 300 is shown. In this embodiment, static logic is used instead of dynamic (precharged) logic. In lieu of a separate precharge line, precharge transistors 308a–308d pull nodes 302a–d high when their associated start pointer bits are not asserted. Because the pass transistors between an asserted start pointer bit and the next asserted end bit are active, activating a single precharge transistor with the asserted start pointer bit charges all nodes between the asserted start bit and the first asserted end bit.

Figure 6:
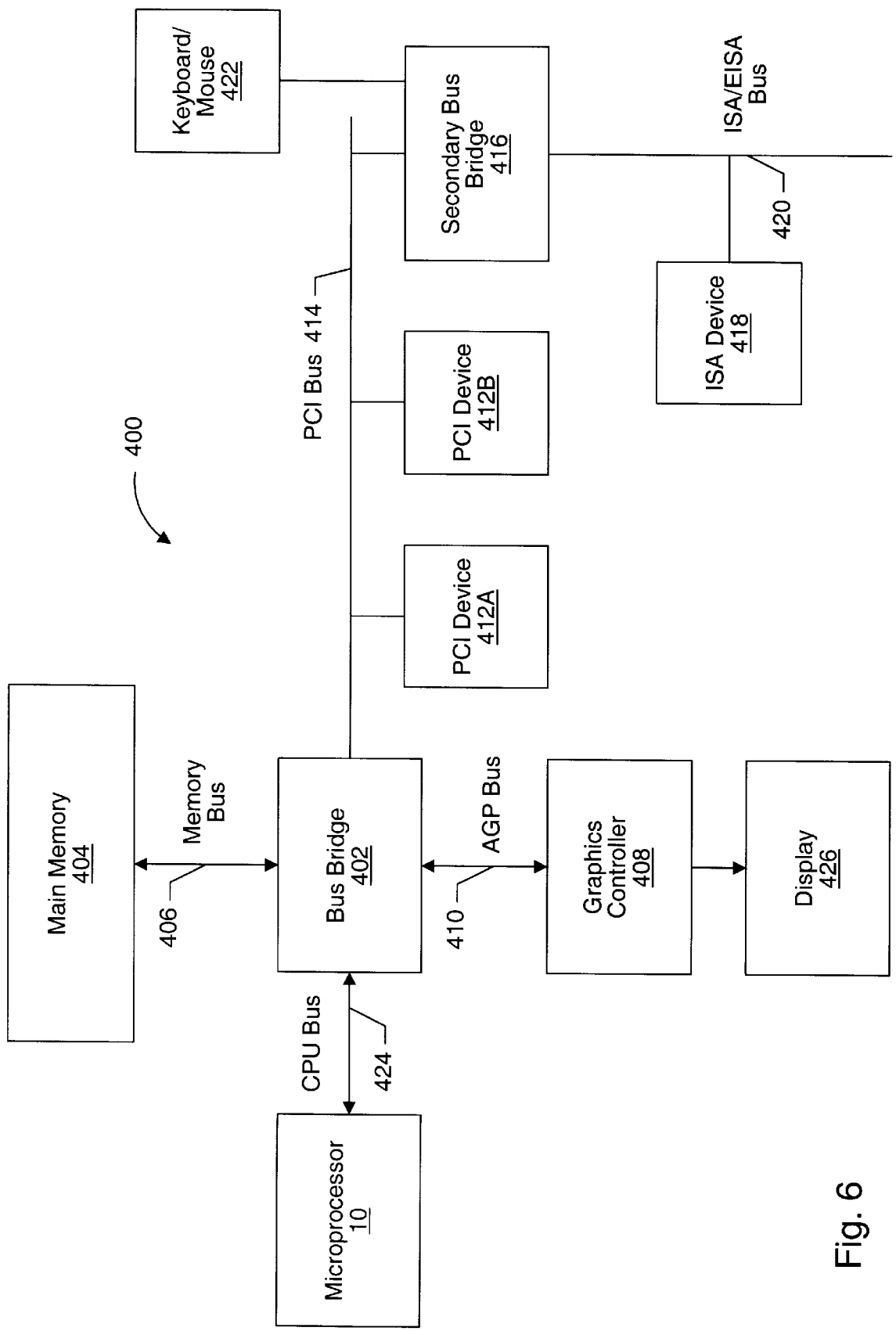
FIG. 6 is a diagram showing one embodiment of a computer system configured to utilize the microprocessor of FIG. 2.

Turning now to FIG. 6, a block diagram of one embodiment of a computer system 400 including microprocessor 10 coupled to a variety of system components through a bus bridge 402 is shown. Other embodiments are possible and contemplated. In the depicted system, a main memory 404 is coupled to bus bridge 402 through a memory bus 406, and a graphics controller 408 is coupled to bus bridge 402 through an AGP bus 410. Finally, a plurality of PCI devices 412A–412B are coupled to bus bridge 402 through a PCI bus 414. A secondary bus bridge 416 may further be provided to accommodate an electrical interface to one or more EISA or ISA devices 418 through an EISA/ISA bus 420. Microprocessor 10 is coupled to bus bridge 402 through a CPU bus 424.

Bus bridge 402 provides an interface between microprocessor 10, main memory 404, graphics controller 408, and devices attached to PCI bus 414. When an operation is received from one of the devices connected to bus bridge 402, bus bridge 402 identifies the target of the operation (e.g. a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may further incorporate additional functionality, as desired. For example, in one embodiment, secondary bus bridge 416 includes a master PCI arbiter (not shown) for arbitrating ownership of PCI bus 414. An input/output controller (not shown), either external from or integrated with secondary bus bridge 416, may also be included within computer system 400 to provide operational support for a keyboard and mouse 422 and for various serial and parallel ports, as desired. An external cache unit (not shown) may further be coupled to CPU bus 424 between microprocessor 10 and bus bridge 402 in other embodiments. Alternatively, the external cache may be coupled to bus bridge 402 and cache control logic for the external cache may be integrated into bus bridge 402.

Main memory 404 is a memory in which application programs are stored and from which microprocessor 10 primarily executes. A suitable main memory 404 comprises DRAM (Dynamic Random Access Memory), and preferably a plurality of banks of SDRAM (Synchronous DRAM).

PCI devices 412A–412B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures which can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc. It is noted that, while the AGP, PCI, and ISA or EISA buses have been used as examples in the above description, any bus architectures may be substituted as desired.

Numerous variations and modifications will become apparent to those skilled in the art once the above disclosure is fully appreciated. It is intended that the following claims be interpreted to embrace all such variations and modifications.

What is claimed is:

1. An apparatus for generating a valid mask from a start pointer and a plurality of end bits comprising:
   a plurality of blocks, wherein said plurality of blocks are coupled in series, and wherein each block comprises:
   a series of NOR gates, wherein each NOR gate receives as inputs one bit from said start pointer and one bit from said plurality of end bits;
   a series of nodes, wherein said series of nodes has a first node and a last node;
   a series of pass transistors, wherein each pass transistor connects two of said series of nodes in series, wherein each pass transistor is controlled by the output of one of said series of NOR gates;
   a series of discharge transistors, wherein one discharge transistor is connected to each of said series of nodes, wherein each discharge transistor is controlled by one of said plurality of end bits; and
   a series of valid mask bit outputs, wherein each valid mask bit output is connected to one of said series of nodes.

2. The apparatus for generating a valid mask as recited in claim 1 wherein said nodes are precharged to an asserted state before said valid mask is generated.

3. The apparatus for generating a valid mask as recited in claim 2 wherein the output from said last node of each block is provided as input to a feedback discharging transistor of another block, wherein said feedback discharging transistor is coupled to said first node and is configured to discharge said first node if said last node is discharged.

4. The apparatus for generating a valid mask as recited in claim 3 further comprising a carry-out output that is connected to said last node.

5. The apparatus for generating a valid mask as recited in claim 4 further comprising a carry-in input, wherein said carry-in input controls the discharging of a first node discharging transistor, wherein said first node discharging transistor is coupled to said first node and is configured discharge said first node according to said carry-in input.

6. The apparatus for generating a valid mask as recited in claim 5, wherein said discharge transistors comprise transistors having a source connected to said node and a drain connected to ground.

7. The apparatus for generating a valid mask as recited in claim 6, wherein said precharge transistors comprise transistors having a source connected to a voltage source and a drain connected to said node.

8. The apparatus for generating a valid mask as recited in claim 7, wherein each of said series of nodes is pulled high via a pull-up transistor.

9. A microprocessor comprising:
   an instruction cache configured to receive and store instruction bytes, start pointer bits, and end bits; and
   a valid mask generator configured to generate valid masks usable to mask instructions formed by said instruction bytes, wherein said valid mask generator comprises:

a series of mask generation blocks, wherein each block receives a predetermined number of said start pointer bits and said end bits from said instruction cache, wherein each block generates a predetermined number of valid mask bits using said start pointer bits and said end bits, wherein said predetermined number of valid mask bits is less than the total number of bits in the valid bit mask.

10. The microprocessor as recited in claim 9, wherein said series of mask generation blocks are connected in a series, wherein each block outputs a carry-out signal, and wherein each block receives said carry-out signal from a preceding block in the series as a carry-in signal.

11. A method for generating a valid mask from a start pointer and a plurality of end bits comprising:

precharging a series of nodes to an asserted state, wherein said nodes are electrically connected in series by a plurality of transistors, wherein each node has an inverted output that outputs one bit of said valid mask, wherein each node corresponds to one of said plurality of end bits and one particular bit of said start pointer;

electrically isolating the nodes between the start pointer and a first asserted one of said plurality of end bits from the remaining nodes by deactivating one or more of said plurality of transistors; and discharging all nodes corresponding to an asserted end bit, wherein said discharging also discharges all nodes that are electrically connected to a discharging node.

12. The method for generating a valid mask as recited in claim 11 further comprising generating a first carry-out signal based on a voltage level of a last node in said series of nodes.

13. The method for generating a valid mask as recited in claim 12, wherein said method is performed in parallel in a plurality of blocks, wherein said start pointer comprises a plurality of start pointer bits, wherein said method further comprises:

receiving a second carry-out signal in one block from one of said plurality of blocks as an input;

determining whether any of said start pointer bits are asserted; and discharging a first node in said series of nodes if said second carry-out signal is asserted and none of said start pointer bits are asserted.

14. The method as recited in claim 13, wherein said precharging is performed by using dynamic logic.

15. The method as recited in claim 14, wherein said precharging is performed by using static logic.

16. A method for generating a valid mask, the method comprising:

precharging a plurality of nodes to an asserted voltage level with a precharge signal, wherein each node is connected in series to another node by a transistor, wherein each node outputs one bit of said valid mask, and wherein each node has a voltage level controlled by one of a plurality of end bits, one of a plurality of start pointer bits, and said precharge signal;

deactivating one or more of said plurality of transistors to electrically isolate any nodes between a first asserted one of said plurality start pointer bit and a first asserted one of said plurality of end bits from the remaining nodes;

discharging all nodes controlled by an asserted end bit and all nodes connected thereto by an active one of said transistors, wherein said method is performed in parallel in a plurality of blocks, wherein each block comprises a different instance of said plurality of nodes;

generating a first carry-out signal based on the voltage level of a last node in said block;

receiving a second carry-out signal in one block from one of said plurality of blocks as an input; and discharging all nodes in said plurality of nodes if said second carry-out signal is asserted and none of said start pointer bits are asserted.

17. The method as recited in claim 16, wherein said precharging is performed by using dynamic logic.

18. The method as recited in claim 16, wherein said precharging is performed by using static logic.

19. Thde method as recited in claim 16, further comprising reading said end bits from an instruction cache.

* * * * *

UNITED STATES PATENT AND TRADEMARK OFFICE
CERTIFICATE OF CORRECTION

PATENT NO. : 6,148,393
DATED : November 14, 2000
INVENTOR(S) : Tran et al.

It is certified that error appears in the above-identified patent and that said Letters Patent is hereby corrected as shown below:

Claim 19, col. 16, line 39, after "19.", please delete "Thde" and insert --The-- in place thereof.

Signed and Sealed this

First Day of May, 2001

*Attest:*

NICHOLAS P. GODICI

*Attesting Officer*     *Acting Director of the United States Patent and Trademark Office*